3,755,598
MOSQUITO CONTROL AGENTS
Robert K. Howe, Bridgeton, and Walter A. Darlington, Brentwood, Mo., assignors to Monsanto Company, St. Louis, Mo.
No Drawing. Filed Feb. 24, 1970, Ser. No. 13,771
Int. Cl. A01n 9/06, 9/20
U.S. Cl. 424—304       3 Claims

ABSTRACT OF THE DISCLOSURE

N - (3,5 - di(trifluoromethyl)phenyl)azomalononitriles for use in combating mosquitoes.

---

This invention relates to a method of combating mosquitoes employing an N-(3,5-di(trifluoromehtyl)phenyl) azomalononitrile of the formula

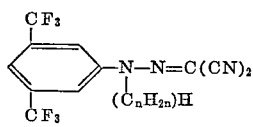

wherein $n$ is an integer from 0 to 4, inclusive, but preferably a whole number from 1 to 3, inclusive, in a toxic or insecticidal amount.

Mosquitoes are well known pernicious insert members of the family Culicidae, many of which being the host vector of a variety of highly destructive diseases to man, animals and birds, particularly those of the genera Aedes (such as the yellow fever mosquito species *Aedes aegypti*), Culex (such as the house mosquito special *Culex pipiens*), anopheles, Psorophora, Haemagogus, and Mansonia (such as the species *Monsonia perturbans*). In accordance with this invention it has been found that these mosquitoes are successfully combated by bringing into contact with the larval stage thereof, as for example by appling to the larvae thereof and/or their habitat an insecticidally effective or toxic amount of an azomalononitrile aforedescribed.

The larvae of the masquito sought to be combated have a water habitant and therefore the azomalononitrile of this invention can be added per se to the water, or in the form of a formulated dust and cast upon the surface of the water, or sprayed upon the water in the form of a solution or liquid dispersion thereof or a liquid emulsion formation thereof, provided the amount applied is a toxic amount.

Although the compounds of this invention are useful per se in combating mosquitoes, it is preferable that they be applied directly to the mosquito larvae and/or their habitat in a dispersed form in a suitable extending agent.

In the instant specification and appended claims it is to be understood that the term "dispersed" is used in its widest possible sense. When it is said that a compound of this invention is dispersed, it means that particles of a compound of this invention may be molecular in size and held in true solution in a suitable organic solvent. It means further that the particles may be colloidal in size and distributed throughout a liquid phase in the form of suspensions or emulsions or in the form of particles held in suspension by a wetting agent. The term "dispersed" also means that the particles can be mixed with and distributed throughout a solid carrier providing a mixture in particulate form, e.g. pellets, granules, powders, or dusts.

In the instant specification and appended claims it is to be understood that the expression "extending agent" includes any and all of those substances in which a compound of this invention is dispersed. It includes therefore, the solvents of a true solution, the liquid phase of suspensions, or emulsions and the solid phase of particulate solids, e.g. pellets, granules, dusts and powders.

The exact concentration of the compound of this invention employed in combating mosquitoes can vary considerably provided the required dosage (i.e. toxic or insecticidal amount) thereof is applied to the larvae and/or its habitat. From a practical point of view, the manufacturer must supply a low-cost concentrate or spray base or particulate solid in such form that, by merely mixing with water or solid extender (e.g. powdered clay or talc) or other low-cost material available at the point of use, there can be had an easily prepared insecticidal spray or particulate solid. In such a concentrate composition, a compound of this invention, for example N - ethyl - N-(3,5-di(trifluoromethyl)phenyl)azomalononitrile, generally will be present in a concentration of 5 to 95 percent by weight, the residue being any one or more of the well-known insecticidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for preparation of solutions, suspensions or emulsions of the compounds of this invention. For example, isopropyl ether, acetone, methyl ethyl ketone, dioxane, cyclohexanone, carbon tetrachloride, ethylene dichloride tetrachloroethane, hexane, heptane and the like higher liquid alkanes, hydrogenated naphthalenes, solvent naphtha, benzene, toluene, xylene, petroleum fractions (e.g. those boiling almost entirely under 400° F. and having a flash point above about 80° F., particularly kerosene), mineral oils and the like.

The compounds of this invention are preferably applied in the form of emulsions or suspensions. Emulsions or suspensions are prepared by dispersing a compound of this invention either per se or in the form of an organic solution thereof in water with the aid of a water-soluble surfactant. The term "surfactant" as employed here in the appended claims is used as in volume II of Schwartz, Perry and Berch's "Surface Active Agents and Detergents" (1958 Interscience Publishers, Inc., New York) in place of the expression "emulsifying agent," to connote generically the various "emulsifying agents," "dispersing agents," "wetting agents" and "spreading agents" that are adapted to be admixed with the compound of this invention in order to secure better wetting and spreading of the active ingredient in the water vehicle or carrier in which it is insoluble through lowering the surface tension of the water (see also Frear "Chemistry of Insecticides, Fungicides and Herbicides," second edition, 1948, p. 280). These surfactants include the well-known capillary active substances which may be anion-active (or anionic) or non-ionizing (or non-ionic) which are described in detail in volume I and II of Schwartz, Perry and Berch's "Surface Active Agents and Detergents," (1958, Interscience Publishers, Inc., New York) and also in the November 1947 issue of Chemical Industries (p. 811–824) in an article entitled "Synthetic Detergents" by John W. McCutcheon and also in the July, August, September, and October 1952 issues of Soap and Sanitary Chemicals under the title "Synthetic Detergents." The disclosures of these articles with respect to surfactants, i.e. the anion-active, and non-ionizing capillary active substances, are incorporated in this specification by reference in order to avoid unnecessary enlargement of this specification. The preferred surfactants are the water-soluble non-ionic surface-active agents set forth in U.S. 2,846,398 (issued Aug. 5, 1958).

The compound of this invention can be dispersed by suitable methods (e.g. tumbling or grinding) in solid extending agents either of organic or inorganic nature and applied in particulate form. Such solid materials include for example, tricalcium phosphate, calcium carbonate, fuller's earth, diatomaceous earth, kaoline, bole, kieselguhr, talc, bentonite, pyrophillite, soybean flour, wood flour, and walnut shell flour, which dusts preferably have a particle size of 5 microns or below and contain from 10 to 75 percent by weight of a compound of this invention. Ordinarily such dusts will be applied at the rate of about 25 to 50 pounds per acre of surface area, however, larger or smaller amounts can be employed. These dusts can also contain from 1 to 5 percent by weight of a nonionic or anionic surfactant or mixture thereof to provide a "wettable" dust formulation. Liquid formulations can be prepared by dissolving or dispersing a compound of this invention in a suitable organic liquid such as 2-octanone and sprayed as such or in admixture with a non-ionic or anionic emulsifier to form a liquid emulsion formulation for spray purposes. The actual effective insecticidal concentration of an azomalononitrile of this invention for insecticidal purposes will depend upon the particular mosquito larvae, weather conditions, and whether it is to be applied directly to the water which forms the habitat for the larvae either as the compound per se or in the form of formulations thereof.

In all of the forms described above the dispersions or formulations or solutions can be provided ready for use in combating mosquito larvae or they can be provided in a concentrated form suitable for mixing with or dispersing in any of the well-known inert extending agents. As illustrative of a particularly useful concentrate is an intimate mixture of an azomalononitrile of this invention with a water-soluble non-ionic surfactant which lowers the surface tension of water in the weight proportions of 0.1 to 15 parts of surfactant with sufficient of an azomalononitrile of this invention to make 100 parts by weight. Such a concentrate is particularly adapted to be made into a spray for controlling various mosquito larvae by the addition of water thereto. As illustrative of such a concentrate is an intimate mixture of 20 parts by weight of N-ethyl - N - (3,5 - di(trifluoromethyl)phenyl) azomalononitrile and from 2 to 4 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for controlling mosquito larvae is a solution (preferably as concentrated as possible) of an azomalononitrile of this invention in an organic solvent therefor. The said liquid concentrate preferably contains dissolved therein a minor amount (e.g. 0.5 to 10 percent by weight of the weight of an azomalononitrile of this invention) of a nonionic or anionic surfactant or mixtures thereof, which surfactant is also water-soluble. As illustrative of such a concentrate is a solution of N-ethyl-N-(3,5-di(trifluoromethyl)phenyl)azomalononitrile in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

In all of the various dispersions, formulations, solutions or concentrates described hereinbefore for mosquito combating purposes, the compounds of this invention can be advantageously employed in combination with other pesticides, including, for example, gastropodicides, bactericides, fungicides, and herbicides, as well as other insecticides. In this manner it is possible to obtain mixtures which are effective against a wide variety of pests and other forms of noxious life.

As illustrative of the compounds of this invention and their preparation but not limitative thereof is the following:

EXAMPLE 1

N-(3,5-di(trifluoromethyl)phenyl)azomalononitrile

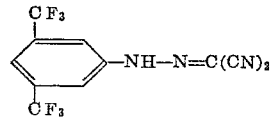

To a suitable reaction vessel equipped with an agitator and thermometer is charged in the cold approximately 30 parts by weight of sodium nitrite, approximately 100 parts by weight of water, and approximately 300 parts by weight of 98% sulfuric acid. While maintaining this mass at 0 to 5ö C. and with agitation is added over approximately 15 minutes a cold solution containing approximately 45.8 parts by weight of 3,5-di(trifluoromethyl) aniline in approximately 150 parts by weight of pyridine. Thereafter the mass is agitated for about 45 minutes while maintaining the temperature at 0 to 5° C. Then and with agitation is added approximately 20 parts by weight of urea in approximately 1200 parts by weight of ice-water. Considerable foaming occurred, and when the foaming stopped, the reaction mass is filtered in the cold and under vacuum. To the filtrate while maintaining it below about 10° C. and with agitation is added a cold solution containing approximately 13.2 parts by weight of malononitrile in approximately 780 parts by weight of ethanol. Thereupon and with agitation while maintaining the temperature below about 15° C. is slowly added approximately 656 parts by weight of sodium acetate. This mass is then allowed to stand in the cold for about 90 minutes, followed by standing for about 30 minutes at room temperature. The resultant thick slurry is then diluted with 2 to 3 times its volume with water, and thereafter filtered. The yellow solid filter cake is washed with water and then taken up with about 900 parts by weight of hot benzene, the small water layer being separated from the organic layer. The latter layer is then concentrated by evaporating under vacuum approximately 75% of the volatiles, cooled, and then filtered. The yellow solid filter cake is washed with ethanol and dried to give yellow crystals of N-(3,5-di(trifluoromethyl)phenyl)azomalononitrile, M.P. 153–155° C. with decomposition. This compound is soluble in acetone, ethyl acetate and dimethyl formamide and insoluble in water.

The N - alkyl - N-(3,5-di(trifluoromethyl)phenyl)azomalononitriles of this invention are readily prepared by the N-alkylation of N-(3,5-di(trifluoromethyl)phenyl) azomalononitrile

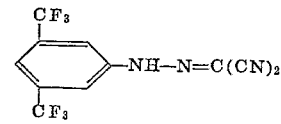

of Example 1 with a dialkyl sulfate of the formula $(RO)_2SO_2$, wherein R is methyl, ethyl, propyl or butyl or the various isomeric forms thereof such as isopropyl, isobutyl, etc., in the presence of sodium or potassium carbonate in a suitable inert organic liquid medium, and to illustrate such is the following:

EXAMPLE 2

To a suitable reaction vessel equipped with a thermometer, agitator and reflux condenser is charged approximately 5.0 parts by weight of N-(3,5-di(trifluoromethyl) phenyl)azomalononitrile, approximately 5.23 parts by weight of diethyl sulfate, and approximately 70 parts by weight of tetrahydrofuran. While agitating the so charged mass approximately 4.69 parts by weight of potassium carbonate is added. The overall mass is then heated to the reflux temperature and refluxed for approximately 20 hours. The mass cooled to room temperature and filtered. The filter cake is washed several times with tetrahydrofuran, and the washings combined with the original filtrate, and concentrated by evaporating the volatiles under vacuum. The residue is then taken up with benzene, and thereto is added sufficient hexane to precipitate the product and the mass permitted to stand overnight. The precipitate is filtered off, recrystallized from a benzene-hexane mixture, filtered, and the filter cake dried to give N-ethyl-N-(3,5-di(trifluoromethyl)phenyl)azomalononitrile, a yellowish solid, M.P. 108.5–110.5° C. This compound is soluble in acetone, chloroform and dimethyl formamide.

EXAMPLE 3

Employing the procedure of Example 2 but replacing diethyl sulfate with an equimolecular amount of diisopropyl sulfate there is obtained solid N-isopropyl-N-(3,5-di(trifluoromethyl)phenyl)azomalononitrile.

EXAMPLE 4

Employing the procedure of Example 2 but replacing diethyl sulfate with an equimolecular amount of dimethyl sulfate there is obtained N-methyl-N-(3,5-di(trifluoromethyl)phenyl)azomalononitrile.

Other N-alkyl-azomalononitriles of this invention are prepared in accordance with Example 2 employing the appropriate dialkyl sulfate include N-(n-propyl)-N-(3,5-di(trifluoromethyl)phenyl) azomalononitrile, N-(n-butyl)-N-(3,5-di(trifluoromethyl)phenyl) azomalononitrile, N-isobutyl-N-(3,5-di(trifluoromethyl)phenyl) azomalononitrile, and the like.

To illustrates the outstanding contact activity of the compounds of this invention at very low concentrations but not limitative thereof as compared to analogous compounds is the following:

A base solution of the compound to be evaluated (itemized in the table below) is prepared by dissolving 1.0 gram thereof in sufficient acetone to provide a 0.10% by weight solution thereof. Then 0.10 ml. of this acetone solution is pipetted into a 25 x 200 mm. culture tube containing sufficient distilled water to provide a concentration of 2 p.p.m. of the compound to be evaluated. The tube is stoppered and shaken vigorously to facilitate complete mixing of its contents. Thereupon approximately 25 early instar yellow fever mosquito larvae (*Aedes aegypti*) are transferred to the tube with the aid of a pipette. The larvae are then held in the tube at 25° C. for 24 hours at the end of which time mortality observations are taken. The results in percent kill of the larvae at a concentration of 2 p.p.m. obtained are set forth below:

| Compound: | Percent |
|---|---|
| N-(3,5-di(trifluoromethyl)phenyl)azomalononitrile | 90 |
| N-ethyl-N-(3,5-di(trifluoromethyl)phenyl) azomalononitrile | 100 |
| N-(4-nitrophenyl)azomalononitrile [1] (see U.S. 3,062,635) | 0 |
| 3,5-di(trifluoromethyl)anilino-methylenemalononitrile (a) | 20 |
| 3,5-dimethylanilino-methylenemalononitrile (b) | 0 |
| N-methyl-3,4-dichloroanilino-methylenemalononitrile [2] | 0 |
| 2-chloro-5-(trifluoromethyl)anilino-methylenemalononitrile (c) | 0 |
| Control (i.e. no added compound). | |

[1] M.P. 224–225° C., prepared in accordance with the procedure of Example 1 herein but employing 4-nitroaniline instead of 3,5-di(trifluoromethyl)aniline in the same molar amount.
[2] J. Org. Chem. vol. 34, p. 230 (1969).

(a) M.P. 233–235° C.
(b) M.P. 215–217° C.
(c) M.P. 177–179° C.

(a), (b) and (c) are prepared by known methods, for example, by reacting the appropriate substituted aniline, that is in the respective cases 3,5-di(trifluoromethyl) aniline, 3,5-xylidine, and 2-chloro-5-(trifluoromethyl) aniline, with ethoxymethylenemalononitrile in an inert organic solvent at elevated temperatures, usually the reflux temperature, the resultant solid anilino-methylenemalononitrile being separated from the reaction mixture by simple filtration.

While this invention has been described with respect to certain embodiments it is to be understood that it is not so limited, and that variations and modifications thereof obvious to those skilled in the art can be made without departing from the spirit or scope thereof.

What is claimed is:

1. A method of combating mosquitoes of the family Culicidae which comprises applying the larvae thereof and their habitat an insecticidally effective amount of an N-(3,5-di(trifluoromethyl)phenyl)azomalononitrile of the formula

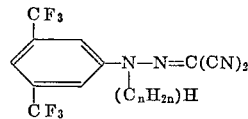

wherein $n$ is an integer from 1 to 3, inclusive.

2. A method in accordance with claim 1 wherein the active compound is N-ethyl-N-(3,5-di(trifluoromethyl) phenyl)azomalononitrile.

3. A method in accordance with claim 2 wherein the species of mosquito is *Aedes aegypti*.

References Cited

UNITED STATES PATENTS

| 3,157,569 | 11/1964 | Addor et al. | 424—304 |
| 3,062,635 | 11/1962 | Acker et al. | 424—304 X |
| 3,157,569 | 11/1964 | Addor et al. | 424—304 |

FOREIGN PATENTS

| 1,033,693 | 6/1966 | Great Britain | 424—304 |

OTHER REFERENCES

Chemical Abstracts, 1965, vol. 63, p. 13278.

ALBERT T. MEYERS, Primary Examiner
D. W. ROBINSON, Assistant Examiner

U.S. Cl. X.R.
424—226